W. CURRAN.
LOOM ATTACHMENT.
APPLICATION FILED NOV. 17, 1919.
1,372,605.
Patented Mar. 22, 1921.
2 SHEETS—SHEET 1.
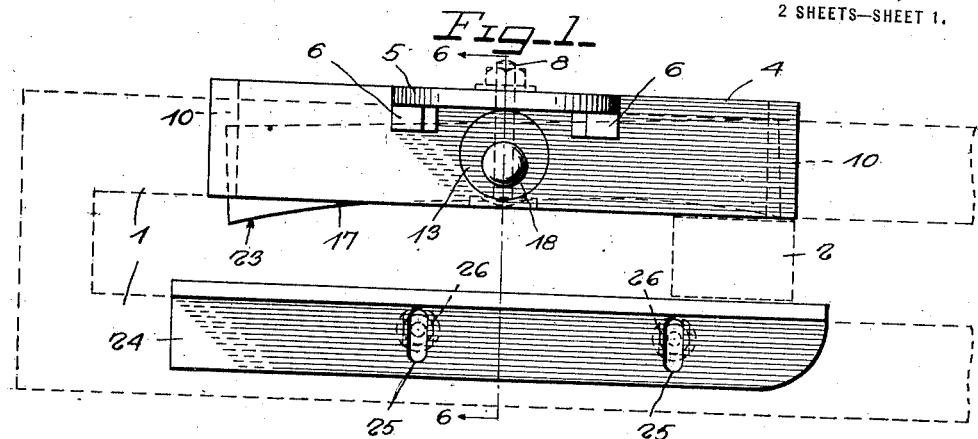
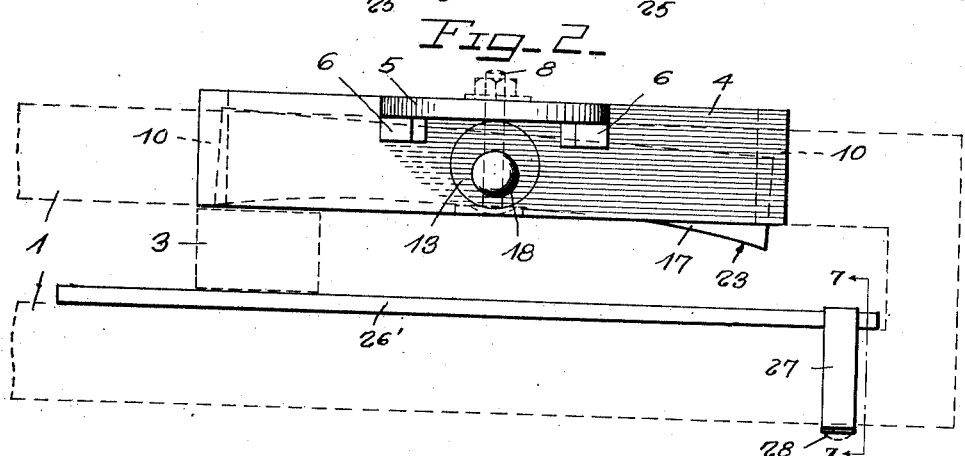
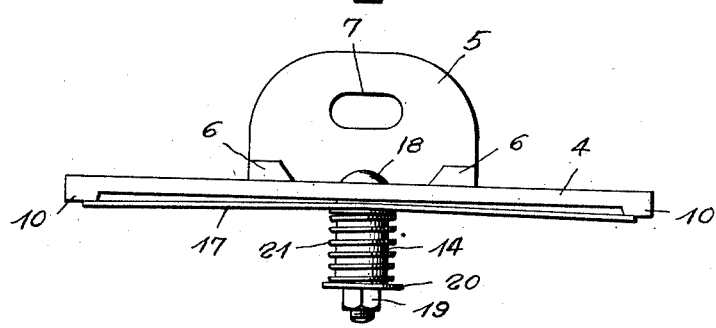
Witness
E. D. Haines.
Inventor
William Curran.
By H. B. Willson & Co.
Attorneys W. CURRAN.
LOOM ATTACHMENT.
APPLICATION FILED NOV. 17 1919.
1,372,605.
Patented Mar. 22, 1921.
2 SHEETS—SHEET 2.
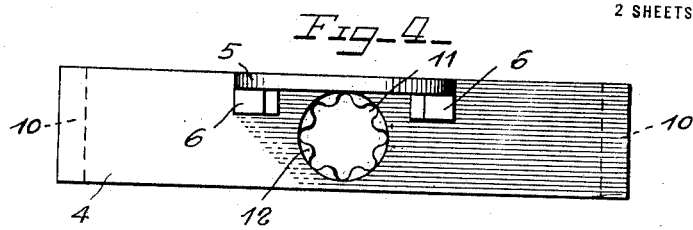
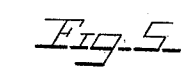
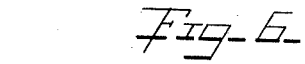
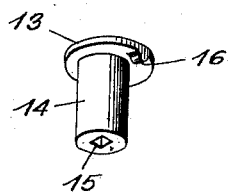
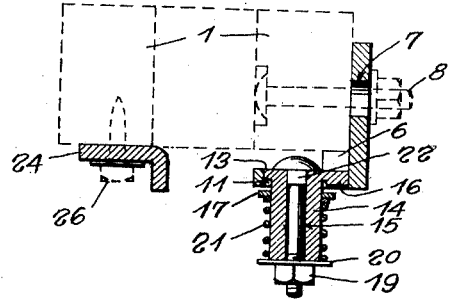
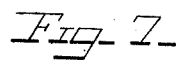
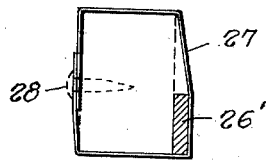
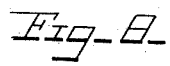
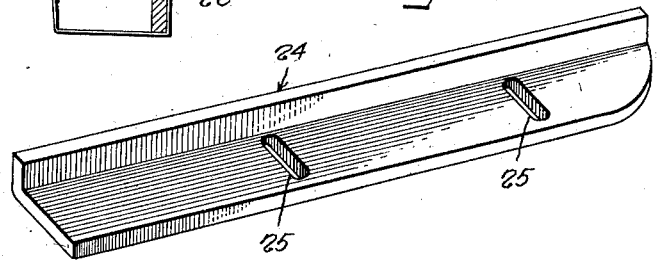
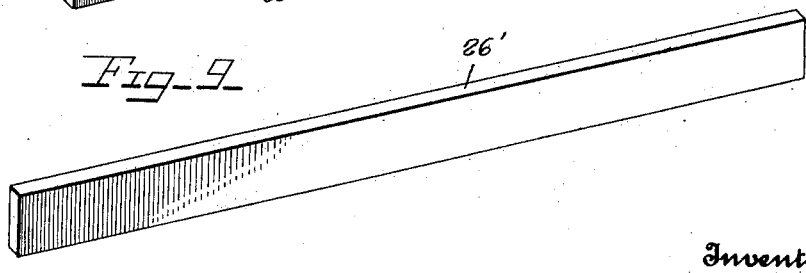
Witness
E. D. Haines.
Inventor
William Curran.
By H. B. Willson &co
Attorneys

UNITED STATES PATENT OFFICE.

WILLIAM CURRAN, OF LEWISTON, MAINE, ASSIGNOR OF ONE-HALF TO PATRICK F. TREMBLAY, OF LEWISTON, MAINE.

LOOM ATTACHMENT.

1,372,605.  Specification of Letters Patent.  Patented Mar. 22, 1921.

Application filed November 17, 1919. Serial No. 338,700.

*To all whom it may concern:*

Be it known that I, WILLIAM CURRAN, a citizen of the United States, residing at Lewiston, in the county of Androscoggin and State of Maine, have invented certain new and useful Improvements in Loom Attachments; and I do declare the following to be a full, clear, and exact description of the invention, such as will enable others skilled in the art to which it appertains to make and use the same.

This invention relates generally to looms, and more particularly to attachments for looms, and is an improvement upon the device covered by my Patent No. 1,286,544, picker stick check, issued Dec. 3, 1918.

One object of the invention is to provide an improved adjustable support for the picker stick check for changing the position and consequent control of the checking bar relative to the picker stick.

With these and other objects in view, the invention consists of certain novel features of construction, and the combination and arrangement of parts as will be hereinafter fully described and claimed.

In the accompanying drawings in which similar reference characters designate like parts throughout the several views:—

Figure 1 is a top plan view of the devices located at one end of the lay of the loom, said lay and the picker stick being shown in dotted lines;

Fig. 2 is a similar view of the devices located at the other end of the lay of the loom, the lay and other picker stick being also shown in dotted lines;

Fig. 3 is a front view of one of the picker stick checks;

Fig. 4 is a top plan view of the supporting plate of one of the picker stick checks;

Fig. 5 is a perspective view of the bushing used in connection with the supporting frame;

Fig. 6 is a transverse sectional view across one end of the lay of the loom taken on the plane indicated by the line 6—6 of Fig. 1;

Fig. 7 is a similar view taken across a portion of the other end of the lay of the loom taken on the line 7—7 of Fig. 2;

Fig. 8 is a perspective view of the strip at one end of the lay of the loom; and Fig. 9 is a similar view of the strip at the other end of the lay of the loom.

In the drawings above briefly described the numeral 1 designates the lay of a loom and 2 and 3 the picker sticks which operate in the lay, the picker stick 2 operating in one end of the lay while the picker stick 3 operates in the other end of the same so as to move the shuttle back and forth. At each end of the lay of the loom and disposed at the portions adjacent the picker sticks 2 and 3 are checking devices, each of which comprise supporting plates 4 having upstanding flanges 5 at one of their edges and lugs 6 formed at the angle between the plates and the flanges. The flanges 5 are provided with elongated slots 7 through which extend bolts 8 whereby to attach the supporting plate to one of the side rails of the lay of the loom. As clearly shown in Fig. 6 the supporting plate 4 is disposed beneath the side rail with the lugs 6 bearing against the latter to hold the plate spaced a short distance below the rail. The supporting plate 4 is provided midway of its ends with a countersunk opening 9 and on its lower side at the ends thereof with friction braking projections 10. The shoulder formed at the lower portion of the opening 9 is provided with a plurality of notches 11 so that this portion of the opening really consists of a number of spaced projections 12.

Disposed in the opening 9 is a bushing consisting of a head 13 which rests upon the upper sides of the projections 12 and a stem 14 which extends entirely through the opening and projects a considerable distance below the plates 4. The stem 14 is arranged eccentrically with respect to the head 13 and there is a rectangular opening 15 extending longitudinally therethrough and continuing through said head. The bushing is adjustably seated in the opening 9 so that its stem 14 may be adjusted toward and away from the edge of the plate remote from that carrying the flange 5 and also so that it may be adjusted longitudinally with respect to the plate. A projection or detent 16, disposed upon the lower side of the head 13, fits into one of the notches 11 between the projections 12 to lock the bushing against turning when said bushing has been properly adjusted.

The numeral 17 designates a checking bar which is pivoted at its middle upon the stem 14 of the bushing and which has its ends bearing against the braking projections 10 and being held in this position by means of a bolt 18 which extends through the opening 15 in the stem 14 having a nut 19 at its lower end and a washer 20 between which and the bar 17 is disposed a coil spring 21. By adjusting the nut 19 the tension of the coil spring may be varied so that the desired pressure of the ends of the bar 17 against the braking projections 10 may be obtained.

It will be noted that the bars 17 under the pressure of the coil spring at its middle will cause it to slightly bend. Turning movement of the bolt 18 is obtained by providing the bolt adjacent its head with a square shaped portion 22 fitting rather snugly against the adjacent sides of the square shaped opening 15. The inner edge of the bar 17, that is, the edge remote from the flange 5 is dished out to provide slightly pitched opposed cam surfaces 23, one of which always projects beyond the adjacent edge of the supporting plate and into the path of the picker stick.

In Fig. 8 of the drawings a right angle strip 24 is shown. The widest flange of this strip is provided with a pair of spaced transversely or laterally extending elongated slots 25 through which screws 26 are extended to movably secure the strip to the lower side of the other side rail of the loom opposite to the picker stick check device at one end thereof. The narrowest flange of the strip 24 extends downwardly and alongside the side rail of the lay of the loom. By providing the aforementioned slots 25 in the widest flange of the strip 24 the latter may be laterally adjusted so that the space between the opposite checking device and its narrowest flange is approximately equal to the width of the adjacent picker stick. By this adjustment the picker stick may be caused to travel at all times in a straight path and will not wabble sidewise. The adjustment of the pivot of the bar 23 also acts to adjust the space in which the picker stick travels, but this adjustable pivot permits the bar 17 to be adjusted longitudinally of the supporting plate 4 and consequently of the stroke of the picker stick and also transversely of the supporting plate so that it will project more or less into the path of the picker stick.

At the other end of the lay of the loom and on the side rail thereof disposed opposite the checking device is a flat strip 26' which is preferably secured to the side rail by means of a band 27 which surrounds one end of the stick 26' and the side rail and is secured to the latter by means of a tack or screw 28. This strip 26 acts to decrease the width of the space between the rails of the lay of the loom to approximately equal the thickness of the picker stick 3 and guides it at all times in a straight path.

From Figs. 1 and 2 of the drawings it will be seen that one end of the bar 17 of each of the checking devices will be disposed at all times in the path of the adjacent picker stick so that when the picker stick is moved forwardly or backward toward the center of the bar it will engage the cam surface at this end and cause the bar to swing so that this end will be pushed back under the supporting plate 4 and the other end will be projected from under the latter so that it may be engaged when the picker stick moves in the opposite direction. By having the pivot of the bar 17 adjustably mounted the latter may be adjusted longitudinally so as to properly position it with respect to the path of the picker stick and also to adjust it so it will project more or less into the path of the picker stick. The strips 24 and 26' serve to guide the picker sticks at all times in a straight line and the strip 24 being adjustable it may be moved inwardly as either it or the adjacent picker stick become worn.

From the foregoing description, taken in connection with the accompanying drawings, the construction, use and operation of the invention may be readily understood.

Various changes in form, proportion, and in the minor details of construction may be resorted to without departing from the spirit of the invention as defined in the claims.

What is claimed is:

1. In a loom mechanism, a checking bar having a portion extending into the path of a picker stick, a friction braking element against which said checking bar is slidingly seated, a pivotal support for said bar, said pivotal support being mounted for adjustment toward and from the path of the picker stick and provided with a detent for holding said pivotal support in different adjustments, and a spring on said support and pressing said checking bar against said braking element and also holding said detent in its effective positions.

2. In a loom, the combination of a bar extending longitudinally of the picker stick path and located at one side thereof, the inner edge of said bar having opposed cam surfaces adapted to be struck by the picker stick during its proceeding and receding strokes, friction braking elements against which the ends of said bar bears, a pivotal support for said bar, a spring on said support and bearing against said bar for holding its ends in frictional contact with said braking elements, said pivotal support being mounted between said braking elements and adjustable toward and away from the picker stick and provided with a detent, said detent being held in its effective position by said spring and being effective to hold said support in its different adjustments and a strip extending longitudinally of the picker stick path and located at the other side thereof opposite said bar, said strip bearing against the picker stick and in conjunction with said bar checking and guiding the picker stick in a straight line.

3. In a loom mechanism, a checking bar having a portion extending into the path of a picker stick, a friction braking element against which said checking bar is slidingly seated, a pivotal support for said bar, said pivotal support being provided with a head whose center is eccentric to the center of said pivotal support for permitting lateral adjustment of said pivotal support, a seat for said head, a spring, and means coacting with said spring for pressing said checking bar against said braking element and pressing said head in said seat, the latter being provided with means to secure the head in its different adjustments.

4. In a loom mechanism, a checking bar having a portion extending into the path of a picker stick, a friction braking element against which said checking bar is slidingly seated, a pivotal support for said bar, said pivotal support being provided with a circular head having a detent on its inner side, said pivotal support being eccentric to said head, a seat for said head, said seat having an opening through which said pivotal support extends, said seat providing a circular wall against which the periphery of said head is normally fitted, said seat also comprising a circular series of inward projections on which said head is normally seated while said detent is fitted between any elected two of said projections, said head being axially movable and rotatable to adjust said pivotal element substantially as specified.

5. A picker stick check comprising a supporting plate extending longitudinally of the picker stick path and on one side thereof, said plate having a countersunk opening therein and braking projections at its ends on one flat side thereof, a stick checking bar extending longitudinally of said plate and having its ends bearing against said projections, one edge of said bar having cam surfaces to be struck by the picker stick during its proceeding and receding strokes, a bushing including a head disposed in said opening and a stem extending therethrough and through said bar to form a pivot therefor, means for holding said bushing in said opening and said bar with its ends against said projections, said bushing being turnably adjustable in said opening and said stem being eccentric with respect to said head whereby the position of said bar with respect to said plate is adjustable.

6. A picker stick check comprising a supporting plate extending longitudinally of the picker stick path and on one side thereof, said plate having an opening extending through the middle portion thereof and braking projections at its ends on one flat side, projections extending inwardly from a portion of the edge of said opening, a stick checking bar extending longitudinally of said plate and having its ends bearing against said braking projections, one end of said bar having cam surfaces to be struck by the picker stick during its proceeding and receding strokes, a bushing including a head resting upon the second named projections and a stem extending through said opening and through said bar to form a pivot for the latter, a coil spring disposed between the free end of said stem and the adjacent side of said bar to hold the latter with its ends against said braking projections and to maintain said bushing in position, said bushing being turnably adjustable in said opening and said stem being eccentric with respect to said head whereby to adjust the position of said bar with respect to said plate, and a projection disposed upon said head and fitting between a pair of the last named projections to maintain the said bushing in its adjusted position.

In testimony whereof I have hereunto set my hand.

WILLIAM CURRAN.